(12) United States Patent
Selden et al.

(10) Patent No.: US 11,999,277 B2
(45) Date of Patent: Jun. 4, 2024

(54) DYNAMIC CONTROL OF ACTIVE SEAT SUSPENSION SYSTEMS

(71) Applicant: ClearMotion Acquisition I LLC, Billerica, MA (US)

(72) Inventors: Brian Alexander Selden, Concord, MA (US); Thomas James Cashman, Jr., Rowley, MA (US); Pankaj Chopra, Watertown, MA (US); Mario Flores Alanis, Cambridge, MA (US)

(73) Assignee: ClearMotion Acquisition I LLC, Billerica, MA (US)

( * ) Notice: Subject to any disclaimer, the term of this patent is extended or adjusted under 35 U.S.C. 154(b) by 677 days.

(21) Appl. No.: 17/055,213

(22) PCT Filed: May 14, 2019

(86) PCT No.: PCT/US2019/032170
§ 371 (c)(1),
(2) Date: Nov. 13, 2020

(87) PCT Pub. No.: WO2019/222179
PCT Pub. Date: Nov. 12, 2019

(65) Prior Publication Data
US 2021/0221264 A1    Jul. 22, 2021

Related U.S. Application Data

(60) Provisional application No. 62/671,735, filed on May 15, 2018.

(51) Int. Cl.
*B60N 2/50* (2006.01)
*B60N 2/02* (2006.01)
*B60N 2/52* (2006.01)

(52) U.S. Cl.
CPC ............ *B60N 2/501* (2013.01); *B60N 2/502* (2013.01); *B60N 2/0268* (2023.08); *B60N 2/525* (2013.01)

(58) Field of Classification Search
CPC .. B60N 2/502; B60N 2/02246; B60N 2/0244; B60N 2/501; B60N 2/062; A47C 4/54;
(Continued)

(56) References Cited

U.S. PATENT DOCUMENTS 2,945,722 A * 7/1960 Horton ............... B60N 2/02246
296/68.1
4,913,482 A * 4/1990 Hanai .................... B60N 2/501
296/65.02
(Continued)

FOREIGN PATENT DOCUMENTS

CN    103847966 A      6/2014
CN    204493567 U  *  7/2015  ............... F16F 9/32
(Continued)

OTHER PUBLICATIONS

International Search Report and Written Opinion for International Application No. PCT/US2019/032170 dated Aug. 6, 2019.

*Primary Examiner* — Yuri Kan
(74) *Attorney, Agent, or Firm* — Wolf, Greenfield & Sacks, P.C.

(57) ABSTRACT

Embodiments related to systems and methods for controlling the relative amounts of rotation and heave motions applied to a seat by an active seat suspension system are described.

20 Claims, 4 Drawing Sheets

(58) Field of Classification Search
CPC .. A61B 5/4023; F16F 7/00; F16F 9/32; B60G 17/0162
See application file for complete search history.

(56) References Cited

U.S. PATENT DOCUMENTS

| | | | | |
|---|---|---|---|---|
| 6,088,643 A * | 7/2000 | Long | ........................ | A47C 4/54 |
| | | | | 297/284.3 |
| 9,452,692 B1 * | 9/2016 | Rawlinson | ............. | B60N 2/062 |
| 2017/0136842 A1 * | 5/2017 | Anderson | ............ | A61B 5/4023 |
| 2018/0015842 A1 * | 1/2018 | Hardee | ................ | B60N 2/0244 |

FOREIGN PATENT DOCUMENTS

| | | | | |
|---|---|---|---|---|
| CN | 206682207 U | * | 11/2017 | ................ F16F 7/00 |
| CN | 107650750 A | | 2/2018 | |
| EP | 1 577 155 A2 | | 9/2005 | |
| EP | 2 431 218 A1 | | 3/2012 | |
| WO | WO 2004/035345 A2 | | 4/2004 | |

* cited by examiner

DYNAMIC CONTROL OF ACTIVE SEAT SUSPENSION SYSTEMS

CROSS-REFERENCE TO RELATED APPLICATIONS

This application is a national stage filing under 35 U.S.C. § 371 of International Patent Application Serial No. PCT/US2019/032170, filed May 14, 2019, which claims the benefit of priority under 35 U.S.C. § 119(e) of U.S. Provisional Application Ser. No. 62/671,735, filed May 15, 2018, the disclosures of each of which are incorporated by reference in their entirety.

FIELD

Disclosed embodiments are related to the dynamic control of active seat suspension systems.

BACKGROUND

Vehicles are subjected to various motion inputs as they are operated. For example, as a vehicle is driven down a road, motions and accelerations may be input to the vehicle from a variety of sources including, but not limited to, road inputs (e.g. bumps, pot holes, and other changes in elevation), steering inputs, acceleration and/or braking events, and other appropriate sources. Accordingly, vehicles include suspension systems such as passive, semi-active, and/or active suspension systems to mitigate at least a portion of these accelerations and displacements that may be transmitted to a frame of the vehicle. These accelerations and displacements may then be transferred to a cabin of the vehicle in which a vehicle occupant is located. To help mitigate these accelerations and displacements from being transmitted to a vehicle occupant located within the vehicle cabin, some vehicles may include active seat suspension systems that may control motion of an associated vehicle seat in one or more translational and/or rotational directions including, for example, heave, roll, and/or pitch, to at least partially mitigate the accelerations and displacements that are transmitted to the seat and occupant.

SUMMARY

In one embodiment, a method for controlling motion of a seat in a vehicle may include: applying a first rotation response and a first heave response to the seat with a first control strategy; receiving a vehicle condition of the vehicle; determining a second control strategy based at least partly on one or more of a driving condition of the vehicle and the vehicle condition; and applying a second rotation response and a second heave response to the seat with the second control strategy.

In another embodiment, a vehicle seat active suspension may include at least two actuators configured to be attached to the vehicle seat to control rotation of the vehicle seat about at least one axis and heave of the vehicle seat. The vehicle seat active suspension may also include a controller operatively coupled to the at least two actuators. The controller may be configured to command the at least two actuators to apply a first rotation response and a first heave response to the seat with a first control strategy. The controller may also be configured to receive vehicle condition about the vehicle to determine a second control strategy based at least partly on one or more of a driving condition of the vehicle and the vehicle condition. The controller may be configured to command the at least two actuators to apply a second rotation response and a second heave response to the seat with the second control strategy.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale unless indicated to be so. In the drawings, each identical or nearly identical component that is illustrated in various figures may be represented by a like numeral. For purposes of clarity, not every component may be labeled in every drawing. In the drawings.

DETAILED DESCRIPTION

Certain types of active seat suspension systems may include two or more actuators that are operated cooperatively to control motion of a vehicle seat in two or more directions including roll and heave of the vehicle seat. For example, in the case of two linear actuators attached to opposing portions of a vehicle seat base, if both actuators are extended or compressed synchronously by the same amount in the same direction, then the vehicle seat may move vertically up or down. In this way, heave can be controlled. Similarly, if only one actuator is displaced, or if each actuator moves in a different direction or by a different quantity, then the seat may roll relative to the vehicle, and in some instances, may also move the seat vertically providing a combination of roll and heave. However, the Inventors have recognized that in certain types of vehicle active seat suspension systems there may be a trade-off between the amount of heave and roll that may be provided for a seat based on an overall position and orientation of the seat. For example, as detailed further below, providing a desired roll angle may limit an amount of heave response the active seat suspension system is capable of providing and vice versa.

In view of the above, the Inventors have recognized the benefits associated with controlling operation of an active seat suspension system to provide different amounts of control over rotation (e.g. roll and/or pitch) and heave in different operating conditions. For example, it may be desirable to identify the driving and/or vehicle conditions that a vehicle, and seat contained therein, may be subjected to. Based on this information, operation of the active suspension system of a seat may be adjusted to provide more or less motion mitigation in the rotational and/or heave directions depending on which type of motion mitigation is more desirable during that time period. The operation of the active seat suspension system may continue to be adjusted to provide relatively more or less rotation, heave, and/or motion in any other appropriate direction based on the driving and/or vehicle conditions during operation. Accordingly by providing an increased response and/or range of motion in one direction relative to a response and/or range of motion in another direction based on the conditions a vehicle and/or seat are operated under, it may be possible to provide improved overall motion mitigation for a seat occupant.

In one specific embodiment, an active suspension system of a vehicle seat may be controlled to apply a first rotation response and a first heave response to the seat using a first control strategy. Using information related to a vehicle and/or driving condition, the first control strategy may be updated to a second control strategy. In some embodiments, the second control strategy may be determined using both of the vehicle and driving conditions. Further, in some applications, the one or more driving conditions of the vehicle may be determined based at least partly on the received one or more vehicle conditions. In either case, the second control strategy may be implemented to control the active seat suspension system to apply a second rotation response and a second heave response to the seat.

As elaborated on further below, the rotation of a vehicle seat may correspond to rotation of the vehicle seat about any appropriate axis. For example, in one embodiment, the above-noted rotation may correspond to one or more of roll and/or pitch of the vehicle seat. In one specific embodiment, the noted rotation of the seat may correspond to a roll of the seat.

It should be understood that any number of different control strategies for controlling the relative amounts of rotation and/or heave provided by an active seat suspension system may be implemented. Accordingly, the current disclosure should not be limited to any particular control strategy. That said, several possible control strategies for controlling the amount of rotation and heave applied to a vehicle seat by an active seat suspension system in response to motions, accelerations, and/or forces input to a vehicle and/or vehicle seat are detailed below.

Depending on the particular driving and/or vehicle conditions, it may be desirable to have more command authority over a heave motion or rotational motion of a seat. In which case, it may be desirable to provide relatively more of one type of motion to a seat as compared to the other motion. In one such embodiment, a controller of an active seat suspension system may adjust either a ratio and/or absolute gain of the rotational and/or heave commands. For example, increasing the gain of one type of motion while reducing, or holding constant, the gain of the other type of motion would change the relative amounts of rotational and/or heave motion commanded by the controller to the associated actuators. In either case, the resulting control strategy may be viewed as reducing a sensitivity of an active seat suspension system to motion in the direction in which the corresponding gain is reduced or held constant while increasing the sensitivity of the active seat suspension system in the other direction.

In another embodiment, during certain vehicle and/or driving conditions, a controller of an active suspension system of a seat may prioritize one type of motion over other types of motion. For example, one of a rotational and heave motion of a seat may be prioritized over the other depending on the existing conditions. In such an embodiment, an active suspension system may be actuated to provide either the entire, or some fraction, of a commanded amount of the prioritized type of motion up to a maximum motion range of the prioritized motion. Alternatively, an active suspension system may be actuated to provide the entire commanded amount of a prioritized motion up to a threshold motion range which may correspond to a fraction of a maximum motion range of the prioritized motion. Thus, some portion of the motion range of the active suspension system may be reserved for moving the vehicle seat in one or more directions other than the prioritized type of motion. Using these thresholds, a controller of an active seat suspension system may command the actuators of the active suspension system to provide a commanded motion of the seat in one or more other directions using the remaining range of motion of the active seat suspension system without changing the commanded prioritized motion applied to the seat. For example, if a rotational movement of a seat were prioritized, a controller of the associated active suspension system of the seat may command the active suspension system to apply a desired rotational motion to the seat while using any remaining motion range of the associated actuators to control heave motion of the seat.

In the above embodiment, a prioritized type of motion may be determined in any appropriate fashion based on the driving and/or vehicle conditions that a vehicle and/or seat may be subjected to. Situations in which different types of motion may be prioritized are detailed further below in regards to specific examples of different types of driving and vehicle conditions.

The above-noted, and other, control strategies may be implemented in a number of ways to provide output commands to the actuators of an active suspension system of a vehicle seat. In one exemplary embodiment, the motion commands determined for each type of motion may simply be summed together to provide a desired combination of rotation and heave of a seat. For instance, such an embodiment may be easily implemented in cases where the desired motions are separately determined using variable gains applied to the different types of motion. In another embodiment, two or more separate control loops may be used to separately determine a desired amount of motion of a seat in two or more directions. One or more of these separately determined motions may either be scaled by some appropriate ratio or limited to a threshold motion to provide a desired overall seat motion within the range capabilities of the active suspension system.

It should be understood that the systems and methods described herein may be implemented using any appropriate type of controller. For example, in one embodiment, a proportional-integral-derivative (PID) controller may be used. Other types of control strategies that may be used include, but are not limited to, a lead lag controller, poll placement based state feedback controller, and/or a non-linear controller. Further, the controller may either implement the control strategies described herein in a number of different ways. For example, in some embodiments, the disclosed control strategies may be implemented using continuous changes in the applied motions based on the driving and/or vehicle conditions. Alternatively, in another embodiment, a controller may simply implement predetermined control strategies with predetermined operating parameters depending on the specific driving and/or vehicle conditions that a vehicle and/or occupant are subjected to. Additionally, a controller may implement either feedforward, feedback, and/or combinations of the foregoing control loops for implementing the disclosed control strategies. Accordingly, in view of the above, it should be understood that the current disclosure is not limited to any particular type of controller and/or implementation of the disclosed control strategies and systems.

A driving condition, as that term is used herein, may refer to a combination of road conditions and vehicle maneuvers that a vehicle may be subjected to while driving on a particular surface. For example, vehicle maneuvers that a vehicle may experience during operation may include, but are not limited to, cornering, going straight, navigating gentle turns, braking, accelerating, and/or any other appropriate maneuver that a vehicle may experience during operation. Types of road conditions may include smooth surfaces with relative few low magnitude bumps (e.g. highway road surfaces), short duration changes in road surface elevation (e.g. bumps with elevation changes over shorter distances), longer duration changes in road surface elevation (e.g. wavy or hilly roads that exhibit elevation changes over longer distances) turning, curvature in the road, road banking, a combination of the above (e.g. turning on a hill with bumps), and/or any other type of road condition or surface feature present along a path of travel of a vehicle that may result in one or more accelerations, forces, and/or displacements being applied to a vehicle. It should be noted that in instances where changes in elevation of a road surface a vehicle is operated on are expected, an alignment of the change in elevation, such as an orientation of a bump, relative to a direction of travel of the vehicle may be considered as well. Looking at a combination of these conditions, it may be possible to get an overall view of the types of accelerations and displacements that may be applied to a vehicle during operation as well as the types of motions that may be transmitted to a vehicle occupant through a seat they are located in. For example, larger vertical accelerations and displacements might be expected when traveling over a bumpy road surface where the bumps are oriented perpendicular to the path of travel as compared to instances where the bumps are oriented at non-perpendicular angles to the path of travel of the vehicle in which case increased lateral accelerations and roll of the vehicle may be expected. Accordingly, motion of an active suspension system of a seat in one or more directions may be prioritized relative to motion of the seat in other directions depending on the particular driving conditions the vehicle is subjected to.

A vehicle condition may refer to a physical state of a vehicle, a portion of a vehicle, and/or an occupant of the vehicle as well as settings a vehicle occupant may have input to a controller of a vehicle and/or active suspension system of a seat. Examples of possible vehicle conditions that may be considered may include, but are not limited to: vehicle speed; steering angle; vehicle body accelerations; vehicle pitch and/or roll; seat roll, pitch, and/or heave; seat accelerations; vehicle occupant activity (e.g. driving, reading, sleeping, looking out a window, etc.); passenger specific data (e.g. an adult, child, or infant); biometric data; seat/occupant position and orientation within the vehicle; and/or any other appropriate condition. A controller of an active suspension system of a seat may either use this information to help determine a desired control strategy for the different types of motion and/or to determine a driving condition of the vehicle as elaborated on further below. For example, the controller might adjust the response of an active suspension system associated with a seat based on motions and accelerations that may be transmitted to an occupant of the vehicle based on one or more of the driving and vehicle conditions present during operation of the vehicle. It should be understood that the vehicle conditions are applicable to not only operator-driven vehicle, but also to autonomous vehicles as well.

In some embodiments, one or more vehicle conditions may be used to help determine one or more driving conditions that a vehicle is subject to. For example, a speed, steering angle, and lateral acceleration of a vehicle may be used to determine if a vehicle is going around either a sharp or gentle turn. Similarly, traveling at high speeds with small steering angles and/or relatively minor vertical accelerations applied to the vehicle body may be indicative of a vehicle traveling straight on a highway surface. Long amplitude changes in vehicle height and/or long amplitude accelerations applied to the vehicle body may be indicative of the vehicle traversing a hill or other wavy road surface with long amplitude elevation changes. Of course, it should be understood that the types of driving conditions that may be determined using various types of vehicle conditions are not limited to only those particular combinations and types of driving conditions described above.

While in some embodiments vehicle conditions may be used to determine various types of driving conditions, the current disclosure is not limited to determining driving conditions in only this manner. Instead, in some embodiments, one or more driving conditions may be determined using one or more sensors and/or localized information regarding the road surface along an expected path of travel. In one embodiment, a look ahead sensor (e.g. optical detectors, infrared emitter/detector combinations, laser range finders, radar systems, etc.) may be used to detect obstacles as well as the general characteristics of a road surface along a path of travel of the vehicle. For example, a look ahead sensor may detect a bump on an otherwise relatively smooth road surface along a path of travel of the vehicle. Alternatively, in another embodiment, one or more driving conditions of the vehicle may be communicated to the controller of the active seat suspension system by another controller of the vehicle. In yet another embodiment, a localized position of a vehicle may be determined using GPS, cellular localization strategies, and/or any other appropriate method. This localized position may then be compared to a map stored in local memory containing road surface characteristics (elevation, type of road surface, etc.) and/or any other appropriate information related to a road surface located along a path of travel of the vehicle to determine an expected driving condition. The driving condition may then be used to determine a desired control strategy for an active suspension system of a seat. Alternatively, in some embodiments, either the map, or the controller of the active suspension system, may include predetermined control strategies for use in one or more locations stored in the map. These control strategies may correspond to any of the control strategies described herein, including for example, predetermined gains, gain ratios, thresholds, and/or prioritized types of motions may be associated with one or more locations in the map.

The above noted maps may be stored in a memory associated with either a controller of the vehicle and/or active seat suspension system. Alternatively, the map may be loaded on to the memory in a continuous fashion. In such an embodiment, maps including information related to an area the vehicle is traveling through may be downloaded from a remotely located database and may be updated on a continuous basis as the vehicle continues to travel to new areas. A controller of a vehicle and/or active seat suspension system may be in wireless communication with the remotely located database using any appropriate method including, but not limited to, cellular, radiofrequency, and/or using any other appropriate wireless communication protocol.

Information may be provided to a controller of an active suspension system of a seat in a variety of ways. For instance, in some embodiments, one or more sensors may be operatively coupled to a controller of a seat's active suspension system. Appropriate sensors may include, but are not limited to: inertial monitoring units (IMU's); accelerometers; gyroscopes; load sensors; strain gauges; cameras for detecting occupant activity; look ahead sensors such as optical detectors, infrared emitter/detector combinations, laser range finders, and radar systems; and/or any other appropriate type of sensor. Further, these sensors may be associated with a vehicle frame, a vehicle interior, a seat, an active suspension system of a seat, and/or any other appropriate portion of a vehicle.

In another embodiment, a controller of an active suspension system of a seat may be in communication with one or more controllers of one or more components of a vehicle. These separate controllers may communicate one or more types of information to the active suspension system controller related to either a driving and/or vehicle condition the vehicle is subject to. For example, a vehicle controller may communicate information such as vehicle speed and steering angle to a controller of an active suspension system of a seat.

Information may be communicated to a controller of an active suspension system of a seat from another controller and/or one or more sensors using any appropriate form of communication. For example, a controller of an active suspension system may be in communication with other controllers and/or remotely located sensors over a network such as a CAN bus of the vehicle. Alternatively, in other embodiments, a wireless communication protocol may be used including, but not limited to, Bluetooth, radiofrequency, Wi-Fi, and/or other appropriate wireless communication protocols.

In some embodiments, it may be desirable to permit a vehicle occupant to change an amount of motion mitigation that is provided by an active suspension system of a seat in one or more directions. In other words, the occupant may personalize the control of the active suspension system such that the control strategies implement by a controller of an active seat suspension system may be at least partially based on these user inputs. For example, an occupant may input either a type and/or amount of motion mitigation they may desire in one or more directions using any appropriate input device in communication with the controller of the active seat suspension system. These inputs may then be used to adjust the motion commands output to an active suspension system for moving a seat in one or more directions, e.g. by altering a gain or threshold associated with a type of motion. In one such embodiment, a user may select incrementally more or less rotation and/or heave motion to be applied by a vehicle active seat suspension system. These settings may then be considered when determining an appropriate control strategy for a given set of conditions to provide relatively more or less of the indicated type of motion. In another embodiment, the Inventors have recognized that it may be difficult for an occupant to differentiate between rotation and heave of a seat. Therefore, a user interface may allow an occupant to select between two or more predetermined settings to provide different combinations of rotation and heave motion mitigation by an active seat suspension system.

As used herein, the term "heave" may refer to motion of a seat in a generally vertical direction relative to the vehicle's frame of reference, which in some embodiments herein may be referred to as movement along a Z-axis of a seat and/or vehicle. For example, when a vehicle is stationary and located on level ground, a vertically oriented axis may extend upwards in a direction that is perpendicular to the level ground. Further, in some embodiments, this vertically oriented axis may also be approximately perpendicular to a direction in which an underlying surface of the vehicle interior extends even though a floor of a vehicle interior typically is not flat. In either case, it should be understood that even when a vehicle is no longer located on level ground, terms such as heave, vertical movement, movement along a Z-axis, and/or other similar terms may refer to movement of the seat in a direction that is parallel to this axis which may remain approximately vertical relative to the vehicle's frame of reference. Thus, a vertical axis of a vehicle and/or seat, as well as the associated types of movement noted above, may be understood to be a vertical axis fixed relative to a reference frame of the vehicle, not a global reference frame.

An active suspension system of a seat may provide any desirable range of heave motion. For example, an active suspension system may provide a range of heave motion that is greater than or equal to 1 inch, 2 inches, 3 inches, 4 inches, and/or any other appropriate amount of heave motion. Additionally, an active suspension system may provide less than or equal to 8 inches, 7 inches, 6 inches, 5 inches, and or any other appropriate range of heave motion. Combinations of the above ranges are contemplated including, for example, an active suspension system of a seat with a range of heave motion between or equal to 1 inch and 8 inches. Additional combinations of the above ranges as well as ranges of heave motion both greater than and less than those noted above are also contemplated as the disclosure is not so limited.

As used herein, the term "roll" may refer to the rotational motion of a seat about an axis that is parallel to a generally longitudinal axis of the vehicle passing from a front to a rear of the vehicle. In some embodiments, this may be referred to as roll of a seat or rotation of the seat about an axis that is parallel to an X-axis of the seat, seat base, and/or vehicle. For example, when a vehicle is, not loaded, stationary and located on level ground, a longitudinal axis of the vehicle may pass from a front of the vehicle to a rear of the vehicle in a direction that is generally parallel to the ground. The seat may then rotate, or roll, about an axis that extends in a direction that is parallel to this longitudinal axis of the vehicle. Further, even when the vehicle is not located on level ground, this longitudinal axis still passes from a front of the vehicle to a rear of the vehicle relative to the vehicle's frame of reference regardless of the vehicle's global orientation.

An active suspension system of a seat may provide any desirable range of roll or other types of rotation. For example, an active suspension system may provide a range of rotational motion about one or more axes of rotation that is greater than or equal to 1°, 2°, 3°, and/or any other appropriate angle range. Correspondingly, the active suspension system may provide a range of rotational motion about the one or more axes of rotation that is less than or equal to 6°, 5°, 4°, and/or any other appropriate angle range. Combinations of the foregoing angular ranges of motion for an active suspension system of a seat are contemplated including, for example, a range of angular motion that is between or equal to about 1° and 6°. Of course additional combinations of the above noted ranges as well as ranges of angular motion that are both greater than and less than those noted above are also contemplated as the disclosure is not so limited.

For the sake of clarity, the embodiments described herein are primarily direct to rotation of a vehicle seat to change a roll of the vehicle seat, i.e. rotation of the seat about an axis parallel to a longitudinal axis of the vehicle. However, embodiments in which the disclosed active suspension systems are used to control rotation of the vehicle seat about a different axis that is generally parallel to the ground when the vehicle is stationary and located on a level surface are also contemplated. For example, the disclosed active suspension systems may also be used to control a pitch of a vehicle seat as well as rotation about any other appropriate axis as the disclosure is not limited in this fashion.

For the sake of convenience, the embodiments described below in regards to the figures are depicted as including two actuators including pistons in a tube like device suggesting a hydraulic or pneumatic actuator. However, it should be understood that the current disclosure is not limited to only these types of actuators and/or arrangement of actuators for applying desired motions to a seat. For example, any appropriate number of actuators may be used and these actuators may correspond to any appropriate type and arrangement of actuators. Possible types of actuators may include, but are not limited to, linear electric motors, rotary electric motors, electro-mechanical actuators (e.g. ball screw), electrohydraulic motors, combinations of the foregoing, and/or any other appropriate type of actuator capable of applying a desired motion to an associated seat. Additionally, while direct connections with linearly displaced output shafts of the actuators has been depicted, instances in which various types of transmissions may be used to provide movement of an associated seat in one or more directions are contemplated. For example, an associated transmission operatively coupling an actuator to an associated seat may include gears, linearly translated linkages, rotatable linkages, and/or any other appropriate construction capable of transforming a motion of the actuators into a desired motion of the associated seat.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

Figure 1:
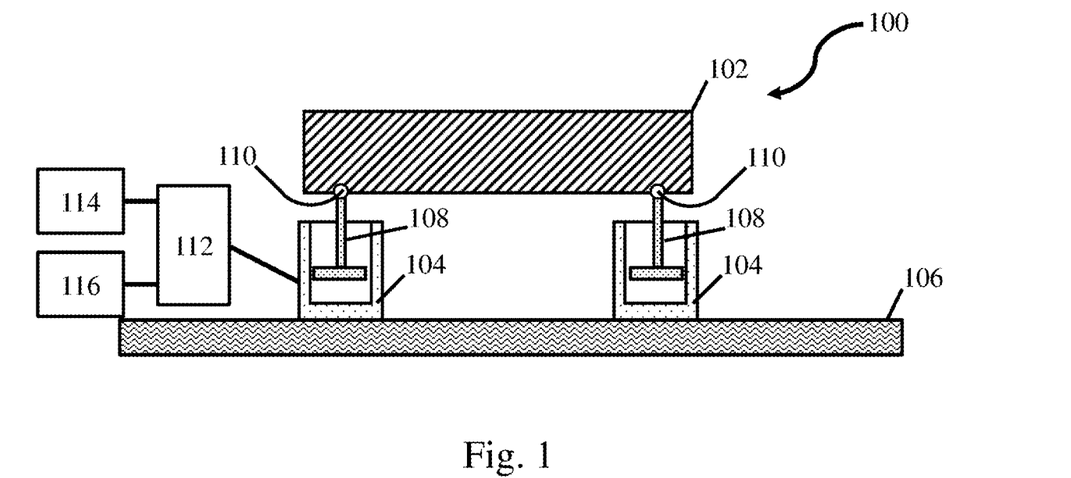
FIG. 1 is a schematic cross sectional view of one embodiment of a vehicle seat connected to an active suspension system in a neutral position.
Figure 2:
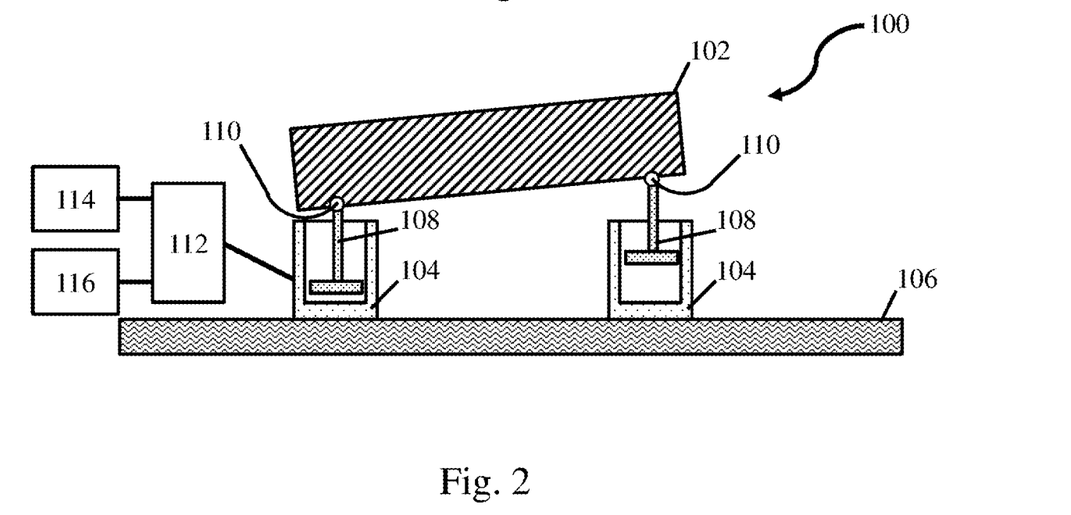
FIG. 2 is a schematic cross sectional view of the vehicle seat and active suspension system of FIG. 1 in a rotated orientation.

FIGS. 1 and 2 depict one possible embodiment of a vehicle active seat suspension system 100. In the depicted embodiment, a vehicle seat 102 is operatively coupled to the linearly displaced output shafts 108 of two actuators 104 which are fixed relative to an underlying surface 106 of the vehicle interior. Specifically, the output shafts may be connected to the seat by connections 110 at locations that are located on opposing sides of a vertical oriented midplane that extends between a front and rear of the vehicle. In some embodiments, the connections are rotatable pin joints, or other appropriate types of connections that are capable of accommodating rotation between the different components while vertical displacing the associated portions of a vehicle seat. To accommodate possible lateral movement of the various components during actuation, in some embodiments, flexible components and/or intermediate linkages may be included between the depicted actuators and vehicle seat.

A controller 112 of the active suspension system 100 of the seat 102 may be operatively coupled to the actuators 104. Thus, the controller may provide commands to controllers of the actuators and/or may directly operate the associated actuators to provide a desired motion to the seat. Additionally as previously noted, one or more sensors 114 may be coupled to, or otherwise in communication with, the controller such that one or more signals from the sensors may be output to, and received by, the controller of the active suspension system. In some embodiments, the controller may also be in communication with one or more other controllers and/or sensors via a network 116 that the controller of the active suspension system is in communication with. As previously described various types of information may be communicated to the controller of the active suspension system over the network which may employ any appropriate wired and/or wireless communication protocol.

FIG. 1 depicts the active suspension system 100 of the vehicle seat 102 in a neutral position such that an axis passing from a base of the seat through a top of the seat, not depicted, is approximately parallel to a vertical axis of the vehicle when it is located on level ground as previously described. Additionally, the output shafts 108 of the actuators 104 may be in approximately a midpoint of their travel range. Subsequently, a rotational motion may be applied to the vehicle seat, as shown in FIG. 2, where the output shaft of one of the actuators has been displaced vertically upwards and the output shaft of the other opposing actuator has been displaced vertically downwards. This may be done to mitigate rotational motion of an occupant's head and/or body. Further, the output shaft that has been displaced vertically downwards is located at its maximum downward vertical displacement. Accordingly, the active suspension system of the vehicle seat is unable to move the vehicle seat in a downward direction without adjusting the roll angle applied to the vehicle seat. Thus, there is no available heave control of the seat without changing the roll angle. Limitations to the heave control response of a seat may also occur when one or more actuators are located at a maximum upward vertical displacement. Similarly, when one or more of the actuators are located at an extreme of its motion range for providing a desired heave position, it may not be possible to change a roll or other type of rotation of the seat without changing the heave position.

As noted previously, and as illustrated by the figures described above, in some types of active seat suspension systems there may be a trade-off between the amounts of rotation and heave that can be applied to a vehicle seat as the end ranges of motion of an active suspension system are approached. Accordingly, in some embodiments, a controller of the active suspension system of a vehicle seat may implement one or more control strategies when a vehicle and/or occupant of the vehicle is subjected to different types of conditions to provide a more optimized amount of rotation and/or heave motion of a seat in these difference situations.

Figure 3:
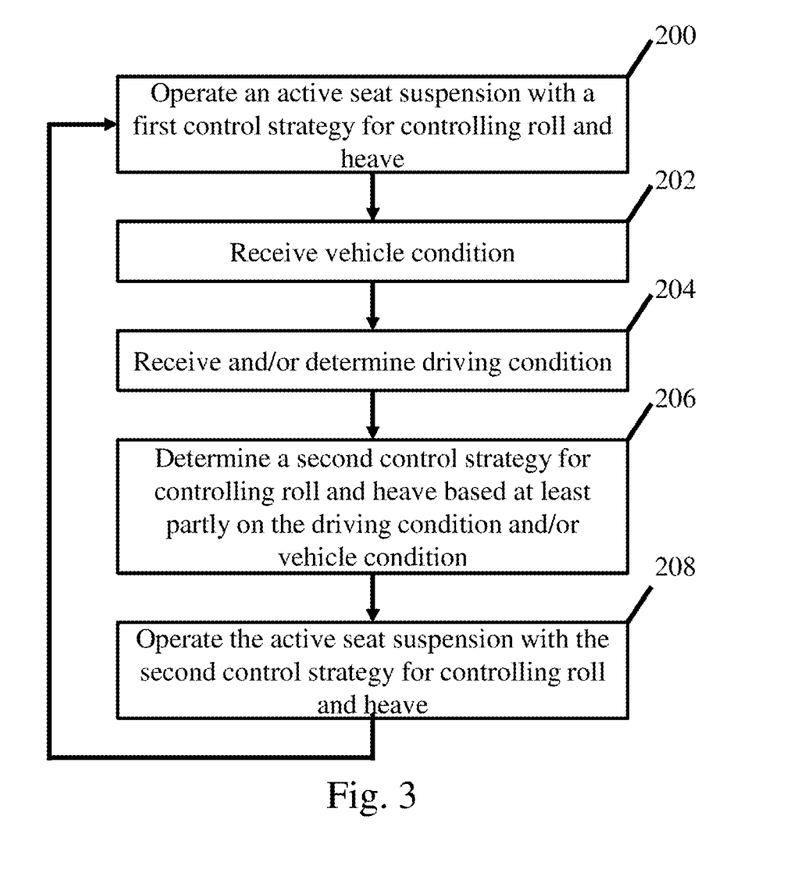
FIG. 3 is a flow diagram of one embodiment of a control method for a vehicle active seat suspension system.

One embodiment of an exemplary method for controlling the motion of an active seat suspension system is shown in FIG. 3. As shown in the figure, at step 200, a controller of an active suspension system may operate the active suspension system with a first control strategy for controlling roll and heave of an associated vehicle seat. As noted previously, this may correspond to using various gains, thresholds, and/or other control parameters for determining a desired amount of roll and/or heave to apply to the vehicle seat. At 202, the controller may receive any appropriate type of vehicle information as previously described. At 204, a controller of the active suspension system of the seat may either receive and/or determine one or more driving conditions of the vehicle. For example, one or more sensors may detect road conditions located along a path travel of the vehicle. Alternatively, in some embodiments, a driving condition may be detected and/or determined by another controller of the vehicle that communicates this information to the controller of the active suspension system of the seat. In another embodiment, one or more vehicle conditions may be used to determine a driving condition. For example, vehicle speed, turning angle, and lateral acceleration may be used to identify cornering maneuvers as compared to other maneuvers that might be performed by the vehicle. In either case, the controller may determine a second control strategy for controlling a roll and heave of the vehicle seat based at least partly on the one or more driving conditions and/or vehicle conditions at 206. At 208 the controller of the active suspension system may then command the active suspension system to apply desired amounts of roll and/or heave to the vehicle seat using the second control strategy. As indicated by the loop, this method may be performed iteratively such that operation of the active suspension system may be continuously updated to provide a more optimized amount of roll and/or heave during different situations.

Figure 4:
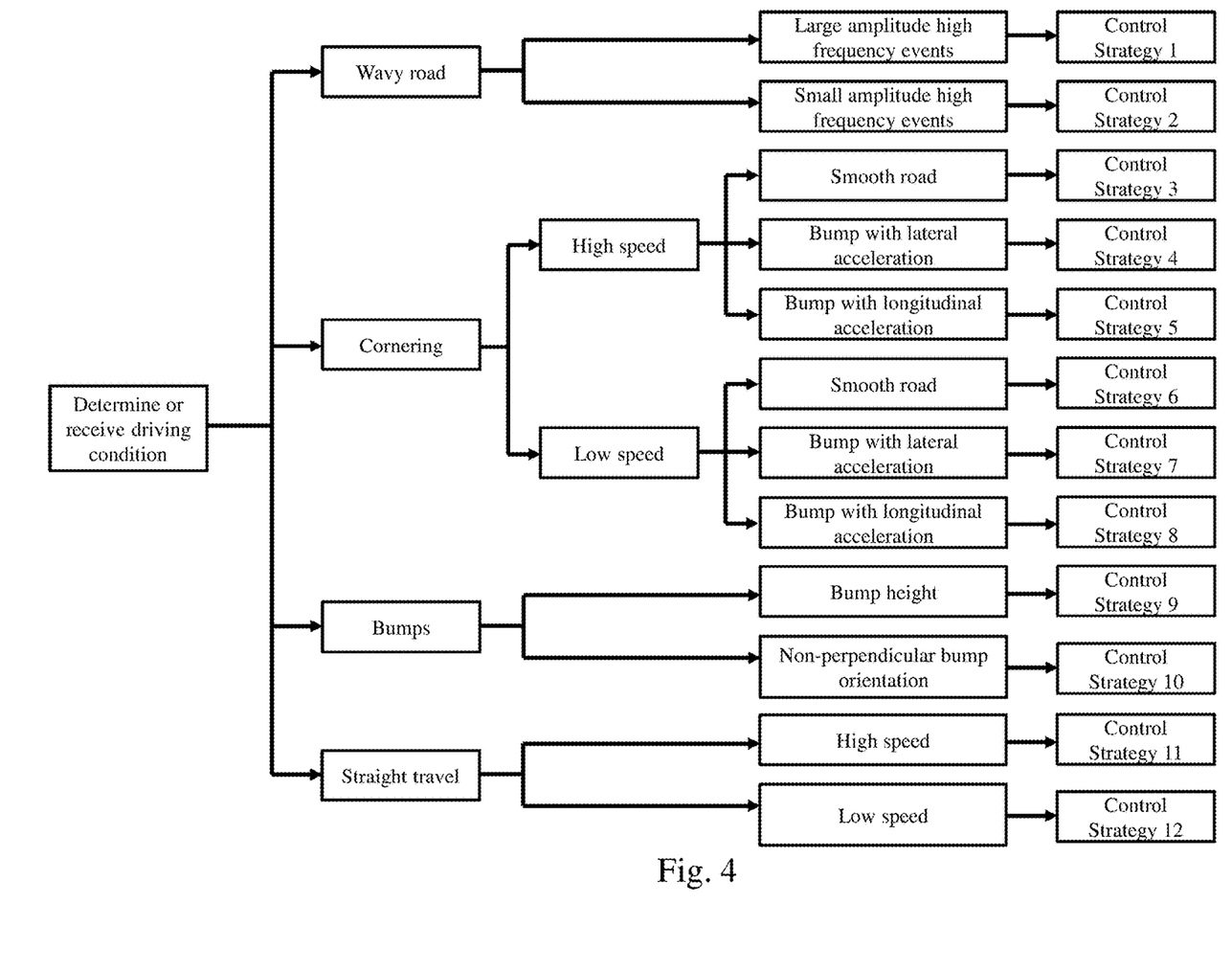
FIG. 4 is a flow diagram of one embodiment of a control method for a vehicle active seat suspension system.

FIG. 4 depicts a flow diagram illustrating a decision tree that may be used to decide between different control strategies for different types of driving and vehicle conditions. Initially, a driving condition may be determined and/or received by a controller of an active suspension system. Several exemplary types of driving conditions and the general types of control strategies for controlling the relative amounts of roll and heave applied to a vehicle seat in these different driving conditions are detailed below.

In a first embodiment, a driving condition may correspond to a vehicle driving on a wavy road. As noted previously, a wavy road may correspond to the presence of rolling hills. Due to the limited motion range of an active suspension system of a seat, the active suspension system is unable to cancel out motions transmitted to a vehicle seat due to travel of the vehicle over a hill. Thus, as compared to other types of driving conditions, when driving on wavy roads corresponding to features such as rolling hills, roll motion of the active suspension system may be increased and/or prioritized relative to heave motion provided by the suspension system due to a decreased need for heave mitigation. In addition to considering operation of the vehicle on a wavy road, a controller of an active suspension system of a seat might also consider the occurrence of different high-frequency events (i.e. short duration events as compared to the longer duration general height variations of the road itself) that occur as the vehicle is driven across the wavy road. For example large amplitude high-frequency events may correspond to the road surface being relatively bumpy whereas lower amplitude high-frequency events may correspond to the road surface being at least relatively smoother which may be due to lower acceleration transmission under these operating conditions. Due to the presence of bumps on the road surface associated with the larger amplitude high-frequency events, an increased amount of heave control may be provided by control strategy 1 associated with operation of vehicle on a bumpy wavy road as compared to the amount of heave control provided by control strategy 2 associated with operation of a vehicle on the smooth wavy road.

As also indicated in FIG. 4, in some embodiments, a controller of an active suspension system of a seat may be used to mitigate motions applied to a seat during a cornering event. For example, in one embodiment, roll of a seat towards a center of rotation of the cornering event may be increased and/or prioritized by a controller during the cornering event. Further, cornering events occurring at higher speeds may be generally associated with travel along smoother surfaces as may occur when steering to follow the gentle curves of a relatively smooth road as compared to turns at lower speeds which may be conducted on generally rougher road surfaces. Thus, in some instances, an increased roll response, as well as a correspondingly reduced heave response, may be applied during cornering events at higher speeds as compared to cornering events at lower speeds. This transition may either be based on a threshold speed or a speed may be used to continuously adjust a control strategy applied to an active suspension system of a seat with varying vehicle speeds. Control strategies for roll and heave during the cornering event may also take into account road conditions such as whether or not the road is smooth as well as the presence of bumps along the road surface that may create lateral and/or longitudinal accelerations of the vehicle and/or vehicle seat. For instance, reduced heave response and increased roll response may be applied on smoother roads as compared to operation on roads with bumps. Further, if bumps are present on the road surfaces that apply lateral accelerations, as compared to the longitudinal accelerations, to the vehicle and/or vehicle seat, a relatively increased amount of roll motion may be provided by the control strategy. Control strategies 3-8 depict various combinations of the cornering events, speed, and road roughness that may be taken into account when determining a desired amount of roll and heave response.

In yet another embodiment shown in FIG. 4, a driving condition a vehicle and seat of the vehicle may be subjected to is the presence of bumps located along a path travel of the vehicle. A control strategy for controlling roll and heave motion of an active suspension system of the seat may take into consideration several parameters related to the bumps, and/or other types of elevation changes, present on the road surface along the path travel of vehicle. For example, a height or elevation change of the bump or other feature may be taken into consideration with larger magnitude elevation changes corresponding to control strategies with increased heave responses. In addition, a controller of an active suspension system of a seat may also take into account an orientation of a bump or other feature exhibiting an elevation change relative to a path travel of the vehicle. For example, bumps and other features that are oriented perpendicular to the path of travel of the vehicle may result in relatively little lateral acceleration and roll of the vehicle and seat. In contrast, bumps and other features that are oriented at a non-perpendicular orientation relative to the path of travel of vehicle may result in increased amounts of lateral acceleration and roll being applied to the vehicle and seat. Accordingly, in instances where a bump or feature is oriented perpendicular to a path of travel of a vehicle a controller of the active suspension system may prioritize and/or increase a heave response while decreasing a roll response of the active suspension system. In contrast, in instances where a bump or other feature is oriented at a non-perpendicular orientation relative to a path travel of a vehicle, a controller of the active seat suspension system may prioritize and/or increase a roll response while decreasing a heave response of the active suspension system. Control strategies associated with these types of considerations are illustrated by control strategies 9 and 10.

In yet another embodiment, and as also illustrated in FIG. 4, a controller of an active suspension system of a seat may determine or receive information regarding a vehicle traveling along a relatively straight path of travel. Again such a driving condition may be determined based on a steering angle of the vehicle as well as a speed of the vehicle. During straight travel, relatively more heave response and less roll response may be provided as compared to other driving conditions such as during cornering events. Additionally, as a vehicle travels at higher speeds, it may be desirable to provide less roll mitigation to an occupant located in the seat to provide increased awareness of vehicle roll occurring at these higher speeds. This reduced roll response may either occur based on a vehicle exceeding a threshold speed, continuously decreasing a commanded roll response with increasing speeds, and/or a combination of the foregoing. For example, in one embodiment, a controller of an active suspension system of a seat may continuously reduce a roll response of active suspension system when a first threshold vehicle speed is exceeded until the roll response is reduced to minimum desired roll response including, for example no roll response, at a second threshold vehicle speed. In one such embodiment, the first threshold speed may be 40 mph and the second threshold speed may be 60 miles per hour. Of course different threshold speeds both greater and less than those noted above are also contemplated as the disclosure is not so limited. Control strategies associated with these considerations are illustrated by control strategies 11 and 12 in FIG. 4.

In another embodiment of FIG. 4, a road classification may be a driving condition that is received or determined. For example, a road classification for a particular road section may be stored on the vehicle or on a remote server. Road sections may be identified on a map stored on the vehicle or remotely and accessed based on a determined location of the vehicle. The location of the vehicle may be determined by a vehicle active suspension (based on a profile of the road), by imaging, laser, sonar, or other appropriate techniques. The road classification may be determined based on the content of the road (e.g., bump frequency, bump type, high frequency vs. low frequency balance, etc.). Based on the road content, the road section may be classified as a flat road, a bumpy road, a curvy road, a hilly road, etc. Based on the road classification, the driving conditions may be classified differently as shown in the decision tree of FIG. 4. For example, a road section that is classified as a bumpy road, would move along the "Bumps" path and the controller would determine an appropriate control strategy.

Figure 5:
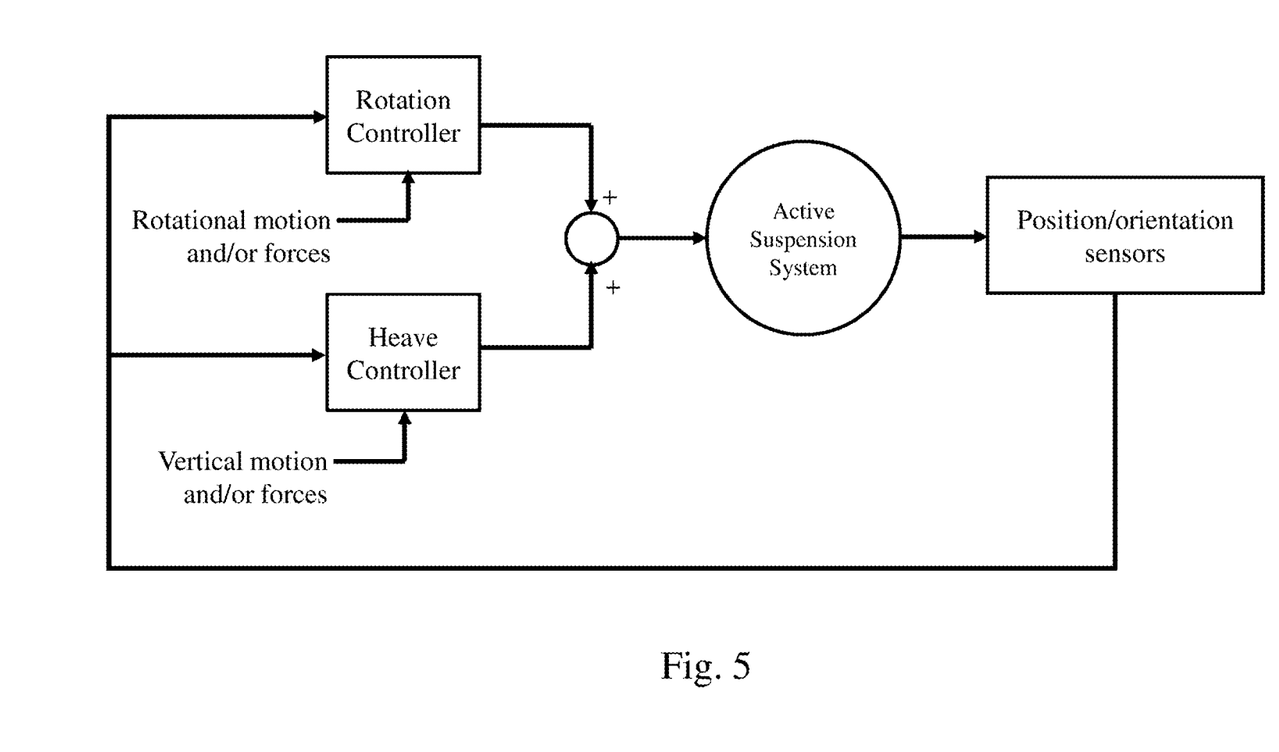
FIG. 5 is a control block diagram of one embodiment for controlling an active seat suspension system.

FIG. 5 illustrates one embodiment of a control block diagram of an active suspension system that may be used to implement the control methods described herein. In the depicted embodiment, the active suspension system of a vehicle seat may include a rotation controller and a heave controller, which in some instances may simply correspond to the same controller. The rotation controller may receive information regarding rotational motion and/or forces transmitted to the vehicle seat as well as information from position and/or orientation sensors associated with the active suspension system. Using this information, along with an appropriate control strategy as detailed above, the rotation controller may determine and output a commanded roll motion of the active suspension system to at least partially mitigate the rotational motion and/or forces transmitted to the vehicle seat. Similarly, the heave controller may receive information regarding vertical motion and/or forces transmitted to a vehicle seat which may be used in conjunction with the position and/or orientation information regarding the active suspension system. Using this information along with the appropriate control strategy, the controller may determine and output a commanded heave motion of the active suspension system to at least partially mitigate the vertical motion and/or forces transmitted to the vehicle seat. These output commands may be summed to provide an overall command that is then output to the active suspension system to provide a total desired motion of the active suspension system.

While a particular control scheme has been described above in regards to FIG. 5, it should be understood that any appropriate method of determining and applying a desired control strategy to control the rotation and/or heave of an active suspension system of a seat may be used. Accordingly, the current disclosure should not be limited to only the embodiments depicted and described herein.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors, which may include the above described controllers of an active seat suspension system, may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Also, the disclosed systems may have one or more input and output devices. These devices can be used, among other things, to present a user interface. Examples of output devices that can be used to provide a user interface include display screens for visual presentation of output and speakers or other sound generating devices for audible presentation of output. Examples of input devices that can be used for a user interface include keyboards, and pointing devices, such as mice, touch pads, and digitizing tablets. As another example, a controller of a system may receive input information through speech recognition or in other audible format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the embodiments described herein may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present disclosure as discussed above. As used herein, the term "computer-readable storage medium" encompasses only a non-transitory computer-readable medium that can be considered to be a manufacture (i.e., article of manufacture) or a machine. Alternatively or additionally, the disclosure may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present disclosure as discussed above. Additionally, it should be appreciated that according to one aspect of this embodiment, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. A method for controlling motion of a seat in a vehicle, the method comprising:
applying a first rotation response and a first heave response to the seat with a first control strategy;
receiving a vehicle condition of the vehicle;
determining a second control strategy based at least partly on one or more of a driving condition and the vehicle condition; and
applying a second rotation response and a second heave response to the seat with the second control strategy;
wherein the first control strategy has a first maximum threshold for at least one of heave and rotation, and wherein the second control strategy has a second maximum threshold for the at least one of heave and rotation wherein the first maximum threshold is different from the second maximum threshold.

2. The method of claim 1, further comprising determining the driving condition based at least partly on the vehicle condition.

3. The method of claim 2, wherein the driving condition is determined at least partly on a localized position of the vehicle and information from a map.

4. The method of claim 1, further comprising receiving the driving condition.

5. The method of claim 1, wherein the second control strategy is determined based at least partly on both the driving condition and the vehicle condition.

6. The method of claim 1, wherein the vehicle condition includes at least one of the seat roll, heave, and pitch.

7. The method of claim 1, wherein the first rotation response is a first roll response and the second rotation response is a second roll response.

8. The method of claim 1, wherein the first maximum threshold and the second maximum threshold for the at least one of heave and rotation is less than a maximum range of motion of the at least one of heave and rotation.

9. The method of claim 1, wherein the first control strategy includes applying a first gain or gain ratio to at least one of heave and rotation, and wherein the second control strategy includes applying a second gain or gain ratio to the at least one of heave and rotation, wherein the first gain or gain ratio is different from the second gain or gain ratio.

10. The method of claim 1, wherein determining the second control strategy further comprises determining the second control strategy based at least partly on a user input.

11. A vehicle active seat suspension system comprising:
at least two actuators configured to be attached to the vehicle seat to control rotation of the vehicle seat about at least one axis and heave of the vehicle seat; and
a controller operatively coupled to the at least two actuators, wherein the controller is configured to command the at least two actuators to apply a first rotation response and a first heave response to the seat with a first control strategy, wherein the controller is configured to receive vehicle condition about the vehicle, wherein the controller is configured to determine a second control strategy based at least partly on one or more of a determined driving condition and the vehicle condition, and wherein the controller is configured to command the at least two actuators to apply a second rotation response and a second heave response to the seat with the second control strategy;
wherein the first control strategy has a first maximum threshold for at least one of heave and rotation, and wherein the second control strategy has a second maximum threshold for the at least one of heave and rotation, wherein the first maximum threshold is different from the second maximum threshold.

12. The vehicle active seat suspension system of claim 11, wherein the controller is configured to determine the driving condition based at least partly on the vehicle condition.

13. The vehicle active seat suspension system of claim 12, further comprising a map stored in local memory operatively coupled to the controller, and wherein the controller is configured to determine the driving condition based at least partly on a localized position of the vehicle and information from the map.

14. The vehicle active seat suspension system of claim 11, wherein the controller is configured to receive the driving condition from at least one of an operatively coupled network and sensor.

15. The vehicle active seat suspension system of claim 11, wherein the controller is configured to determine the second control strategy based at least partly on both the driving condition and the vehicle condition.

16. The vehicle active seat suspension system of claim 11, wherein the vehicle condition includes at least one of the seat roll, heave, and pitch.

17. The vehicle active seat suspension system of claim 11, wherein the at least two actuators are configured to control roll of the vehicle seat about the at least one axis, and wherein the first rotation response is a first roll response and the second rotation response is a second roll response.

18. The vehicle active seat suspension system of claim 11, wherein the first maximum threshold and the second maximum threshold for the at least one of heave and rotation is less than a maximum range of motion of the at least one of heave and rotation.

19. The vehicle active seat suspension system of claim 11, wherein the first control strategy includes a first gain or gain ratio applied to at least one of heave and rotation, and wherein the second control strategy includes a second gain or gain ratio applied to the at least one of heave and rotation, wherein the first gain or gain ratio is different from the second gain or gain ratio.

20. The vehicle active seat suspension system of claim 11, wherein the controller is configured to determine the second control strategy based at least partly on a user input.

* * * * *

UNITED STATES PATENT AND TRADEMARK OFFICE
CERTIFICATE OF CORRECTION

PATENT NO. : 11,999,277 B2
APPLICATION NO. : 17/055213
DATED : June 4, 2024
INVENTOR(S) : Brian Alexander Selden et al.

It is certified that error appears in the above-identified patent and that said Letters Patent is hereby corrected as shown below:

On the Title Page

Item (87), PCT Publication Date, please replace:
"November 12, 2019"
With:
-- November 21, 2019 --

Signed and Sealed this
Sixth Day of August, 2024

Katherine Kelly Vidal
*Director of the United States Patent and Trademark Office*